United States Patent [19]

Mitsui

[11] 4,280,275
[45] Jul. 28, 1981

[54] APPARATUS FOR LAMINATED CORE MANUFACTURE

[75] Inventor: Yoshiaki Mitsui, Kitakyushu, Japan

[73] Assignee: Mitsui Mfg. Co., Ltd., Kitakyushu, Japan

[21] Appl. No.: 30,445

[22] Filed: Apr. 16, 1979

Related U.S. Application Data

[62] Division of Ser. No. 819,480, Jul. 27, 1977, Pat. No. 4,149,309.

[51] Int. Cl.$^3$ .............................................. H02K 15/08
[52] U.S. Cl. ........................................ 29/732; 29/596; 29/605; 29/609
[58] Field of Search ................ 29/596, 598, 606, 605, 29/609, 732, 736, 733, 564.6, 564.1; 310/218, 217, 42

[56] References Cited

U.S. PATENT DOCUMENTS

| | | | |
|---|---|---|---|
| 2,607,816 | 8/1952 | Ryder et al. | 29/596 |
| 2,652,509 | 9/1953 | Gail | 29/733 X |
| 2,711,008 | 6/1955 | Smith | 29/596 |
| 3,175,277 | 3/1965 | Brown et al. | 29/596 |
| 3,202,851 | 8/1965 | Zimmerle et al. | 29/609 X |

*Primary Examiner*—Carl E. Hall
*Attorney, Agent, or Firm*—Wegner, Stellman, McCord, Wood & Dalton

[57] ABSTRACT

A dynamoelectric machine core, method of forming the same, and apparatus for forming the same. The core includes a stacked laminated yoke assembly having an annular array of radially inwardly opening recesses, a stacked laminated tooth assembly having an annular array of annularly spaced teeth definining therebetween winding slots, a dynamoelectric winding in the slots, and cooperating interlock means on the teeth and yoke core assemblies for locking the tooth core assembly to the yoke core assembly. The laminations are blanked out from a metal sheet and interlocked in stacked association with each other by suitable interlock structure formed therein. The teeth are blanked out from the yoke lamination and are subsequently secured to the yoke laminations of the yoke core assembly after the tooth core assembly of the teeth is provided with the dynamoelectric winding. The teeth may be held by a suitable jig during the winding operation which accurately disposes the teeth to define the tooth core assembly and which is removed subsequent to the mounting of the wound tooth core assembly to the yoke core.

2 Claims, 9 Drawing Figures

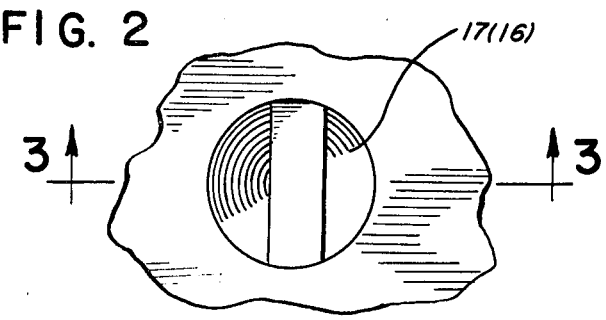
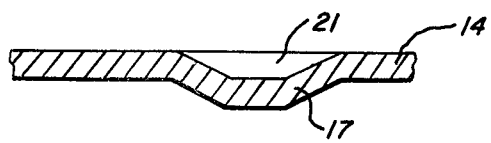
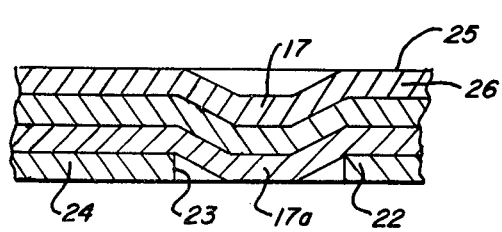
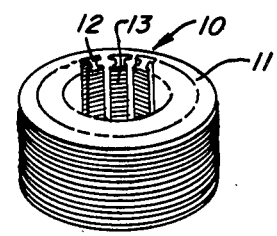
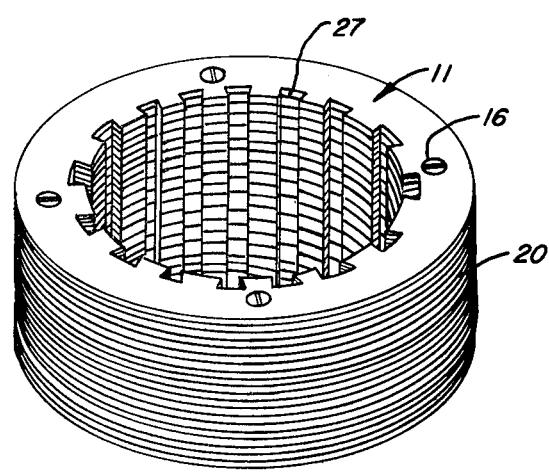

APPARATUS FOR LAMINATED CORE MANUFACTURE

This is a division of application Ser. No. 819,480 filed July 27, 1977, now U.S. Pat. No. 4,149,309.

BACKGROUND OF THE INVENTION

1. Field of the Invention

This invention relates to the manufacture of dynamoelectric machine cores and more specifically to the manufacture of such cores formed of laminated sheet material.

2. Description of the Prior Art

In U.S. Pat. No. 3,202,851 of W. J. Zimmerle et at, a manufacture of a dynamoelectric machine is illustrated wherein interlocked laminations are provided for forming a stator assembly. The laminations are provided with formed projections to define the desired interlocking means between the respective laminations.

Additional prior art patents which show the state of the art in connection with apparatus and processes for forming such stacked laminated structures include U.S. Pat. Nos. Phelps et al 1,817,462, Johnson 1,861,059, Zimmerle 3,210,824, Bausman et al 1,874,158, Heftler 2,283,629, Goran 2,368,295, Roters 2,483,204, Korski 2,763,916, Ebbert 2,933,204, Westphalen 2,971,106, Ploran 2,975,312, Hicks 2,996,791, Rediger 3,012,162, Hopp et al 3,060,992, Post 3,062,262, Boyer 3,070,058, Zimmerle 3,110,831, Zimmerle 3,203,077, and MacLaren 2,998,638. Additionally, Canadian Pat. No. 603,175 of Gordon W. Herzog, and German Pat. No. 917,626 teach interlocked laminated sheet structures for such structures.

SUMMARY OF THE INVENTION

The present invention comprehends an improved manufacture of a dynamoelectric machine core wherein the core comprises a stacked laminated yoke assembly having an annular array of radially inwardly opening recesses, a stacked laminated tooth core assembly having an annular array of annularly spaced teeth defining therebetween winding slots, a dynamoelectric winding in the slots, and cooperating interlock means on the teeth and yoke core assembly in the recesses for locking the tooth core assembly to the yoke core assembly.

The yoke core assembly may be manufactured by the process of blanking out from a metal sheet an annular array of teeth having a shank portion and a head portion, the portion of the sheet from which the head portions are blanked defining a yoke lamination having an annular array of radially inwardly opening recesses, repeating the blanking step to form a plurality of the annular arrays of teeth and the yoke laminations, stacking the plurality of annular arrays of teeth to define an annular tooth core arrangement having a plurality of winding slots, stacking the yoke laminations to define a yoke core, providing a dynamoelectric winding in the tooth core assembly slots to define a wound tooth core assembly, and disposing the wound tooth core assembly within the yoke core with the head portion of the teeth of the tooth core received in the yoke core recesses to define the dynamoelectric machine core.

The invention further comprehends the provision of apparatus for manufacturing the core including means for blanking out seriatim a plurality of annular arrays of teeth having a shank portion and a head portion, the portion of the sheet from which the head portions are blanked defining yoke laminations each having an annular array of radially inwardly opening recesses, means for stacking the plurality of annular arrays of teeth to define an annular tooth core arrangement having a plurality of winding slots, means for stacking the yoke laminations to define a yoke core, means for providing a dynamoelectric winding in the tooth core assembly slots to define a wound tooth core assembly, and means for disposing the wound tooth core assembly within the yoke core with the head portion of the teeth of the tooth core received in the yoke core recesses to define the dynamoelectric machine core.

The head portion of the teeth and the recess of each lamination may comprise complementary undercut interlock means for locking the wound tooth core assembly to the yoke core in the final dynamoelectric machine core construction.

The tooth core assembly may be temporarily retained by a suitable jig to dispose the stacked teeth in accurately annularly related association for facilitated winding of the dynamoelectric winding in the slots therebetween and to provide the mounting thereof for insertion into the yoke core assembly completing the assembly of the dynamoelectric machine core.

The individual laminations may be provided with interlock means which may define complementary male and female portions of the laminations formed therein prior to the stacking operation.

Thus, the present invention comprehends an improved low cost dynamoelectric machine core construction, method of forming the same, and apparatus for effecting the manufacture thereof.

BRIEF DESCRIPTION OF THE DRAWING

Other features and advantages of the invention will be apparent from the following description taken in connection with the accompanying drawing wherein:

FIG. 2 is a plan view of an interlock deformation provided in the lamination;

FIG. 3 is a vertical section taken substantially along the line 3—3 of FIG. 2;

FIG. 4 is a vertical section illustrating the interlocked association of a plurality of the laminations provided with the interlock means of FIG. 2;

FIG. 5 is a perspective view of the stacked yoke core;

FIG. 9 is a perspective view of the completed dynamoelectric machine core.

DESCRIPTION OF THE PREFERRED EMBODIMENT

Figure 1:
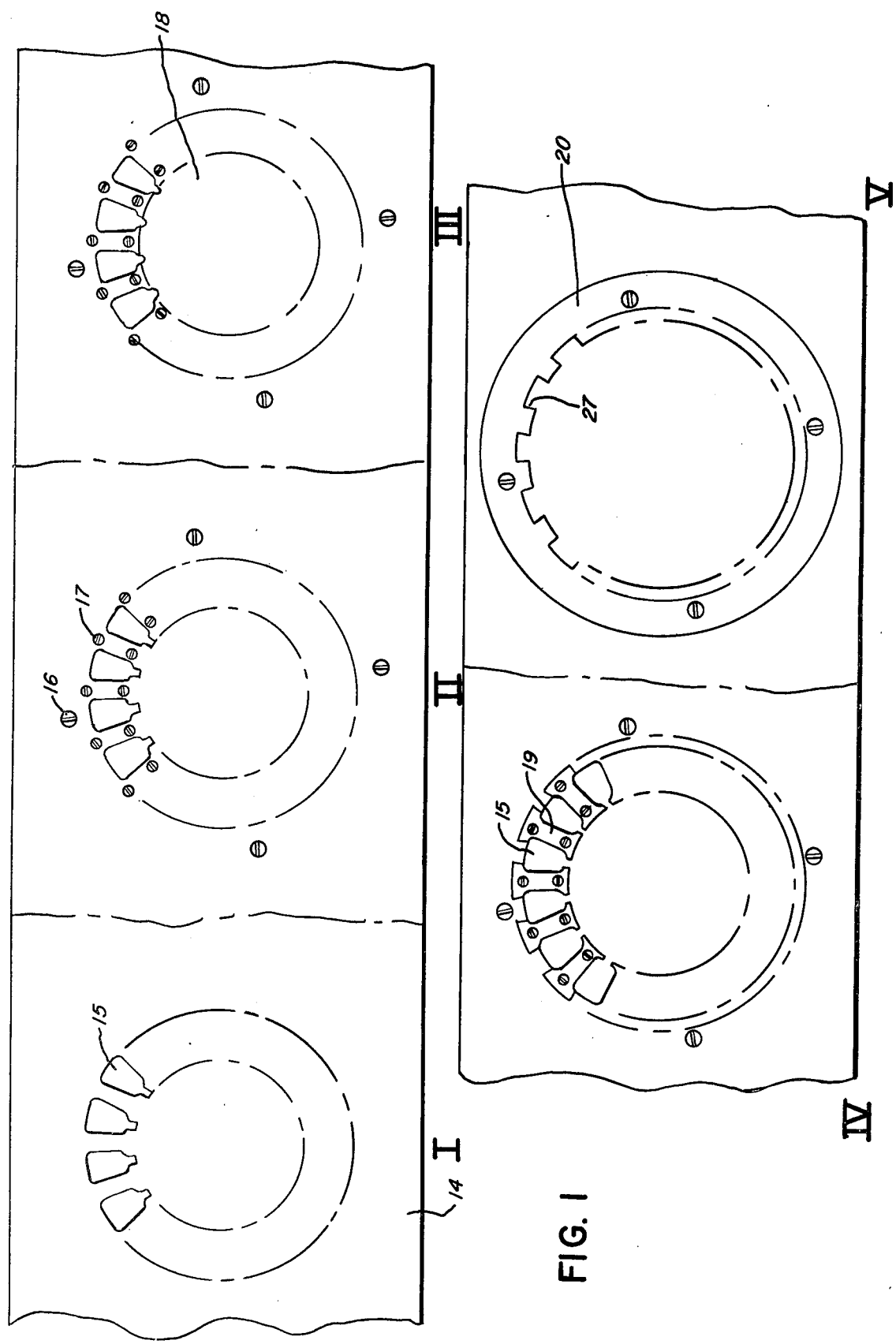
FIG. 1 is a plan view of the sheet metal strip illustrating the blanking out of the strip at successive stations of the forming apparatus.

In the exemplary embodiment of the invention as disclosed in the drawing, a dynamoelectric machine core generally designated 10, as shown in FIG. 9, may comprise the stator core of a dynamoelectric machine. Core 10 is manufactured in accordance with the present invention in a novel manner which, while being extremely simple and economical, provides an improved core construction.

More specifically, the stator core includes an outer laminated yoke core 11 and an inner tooth core 12 which is formed as a separate assembly with the stator winding 13 provided therein, and then mounted in the yoke core 11 to complete the stator core construction. The wound tooth core assembly is interlocked with the yoke core in the stator core assembly to provide a strong, rigid stator core construction in a simple and economical manner.

Each of the yoke core 11 and tooth core 12 may be formed of stacked laminations blanked out from a metal sheet, such as metal strip 14 shown in FIG. 1. As shown therein, the blanking operations may be conducted at successive stations identified as stations I, II, III, IV, and V. At station I, a plurality of slots 15 are provided in an annular array. In station II, a plurality of large interlocked bosses 16 and small interlocked bosses 17 are provided in the strip for defining interlocking means between successive laminations, as will be brought out more fully hereinafter.

In station III, the inner portion 18 of the annular array of slots 15 is blanked out.

In station IV, a plurality of teeth 19 are blanked out between the slots 15. At station V, the annular yoke core lamination 20 is blanked out.

The arrangement of the interlock bosses 16 and 17 to define the means for interlocking the successive laminations of the stacked cores is shown in FIGS. 2-4. Thus, the bosses 17 (it being understood that bosses 16 are similar thereto but somewhat larger) comprise depressions in the strip 14 effected by suitable die means, as will be obvious to those skilled in the art. The downward deflection of the bosses 17 provide upwardly opening recesses 21 into which the downwardly projecting boss 17 of the superjacent lamination projects in fitted relationship, as shown in FIG. 4. The lowermost lamination 22 may be provided with a hole 23 for receiving the projection 17a of the superjacent lamination. By eliminating the depending boss 17 from the lowermost lamination, the lower surface 24 thereof is effectively defined by a single plane. Similarly, the upper surface 25 of the uppermost lamination 26 is defined by a single plane. Thus, the opposite ends of the stator core may be effectively defined by parallel planes.

The interlocking bosses 16 and 17 are provided in the laminations so as to provide maintained integrity of the stacked assembly of the laminations during the manufacturing process. Thus, as shown in FIG. 5, the yoke core laminations 20 are effectively maintained in coaxial aligned association by the cooperating interlocking bosses 16 so as to define a plurality of radially inwardly opening dovetail, or undercut, axially extending slots 27 which, as illustrated in FIG. 1, comprise the portion of the strip from which the slots 15 and teeth 19 are formed.

Figure 6:
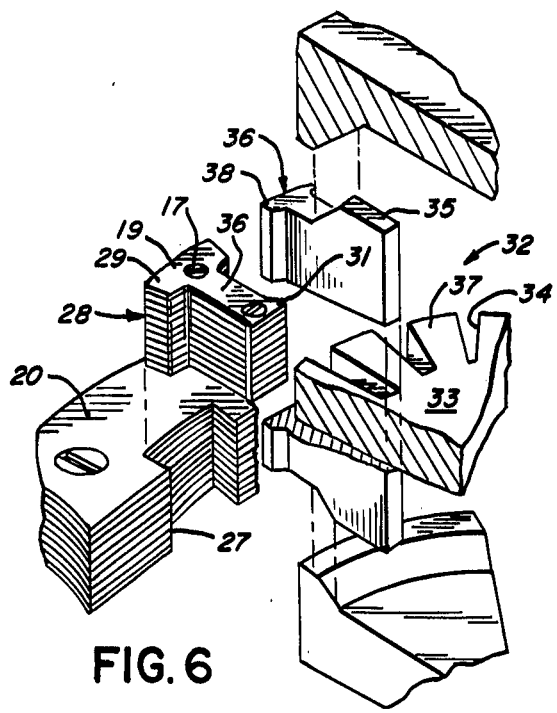
FIG. 6 is a fragmentary exploded perspective view illustrating the jig means for supporting the stacked teeth in forming the wound tooth core assembly.

At station IV, as the successively delivered portions of strip 14 are stamped therein, the stamped tooth laminations are stacked one on the other and interlocked in the stacked association to define a stacked tooth assembly generally designated 28, as illustrated in FIG. 6. Each of the teeth is defined by an undercut head portion 29, a shank portion 30, and a base portion 31. As seen in FIG. 6, the head portion, having been blanked out from the strip to define the slots 27 of the yoke core lamination 20 may have an accurate fit therewith.

As seen in FIG. 6, the base portion 31 is undercut to define a dovetail pull portion of the teeth.

Figure 7:
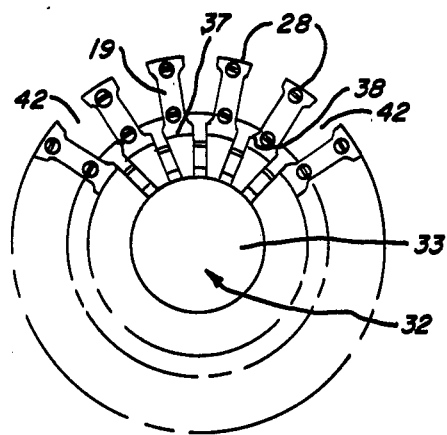
FIG. 7 is a plan view of the stacked teeth carried by the jig means.
Figure 8:
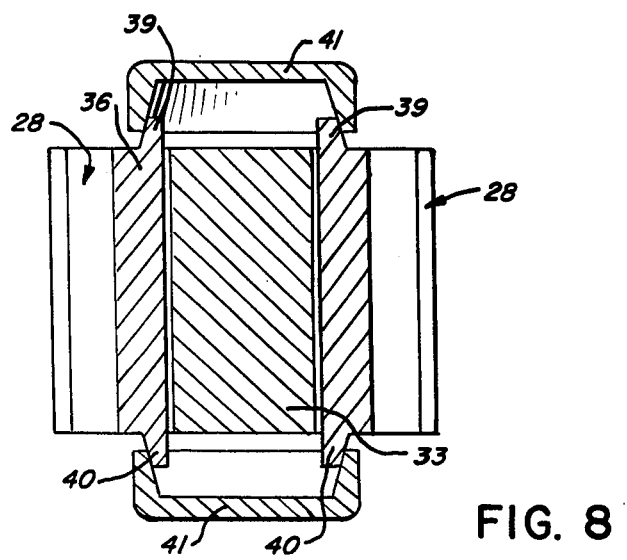
FIG. 8 is a diametric section of the jig means with the stacked teeth mounted therein prior to the winding operation.

Referring now to FIGS. 6, 7 and 8, the stacked tooth assemblies 28 are arranged in an annular array in circumferentially spaced relationship by means of a jig generally designated 32 having a central core bar 33 provided with a plurality of outwardly opening recesses 34 for receiving tapered inner portions 35 of a corresponding plurality of locking pieces 36. As shown in FIG. 7, the outer surface 37 of the core bore 33 between the slots 34 corresponds to the inner diameter of the annular blanked out arrangement of teeth 19. The radially outer portion 38 of the locking pieces is undercut at its opposite sides to engage the undercut base portion 31 of the teeth and retain the teeth against the surfaces 37 between slots 34 of the core bar.

As shown in FIG. 8, the core bore 33 and locking pieces 36 extend the full height of the stacked tooth assemblies 28 and the upper end 39 and lower end 40 of the locking pieces 36 extend axially outwardly to be engaged by cam members 41 drawing the locking pieces forcibly inwardly to lock the tooth assemblies 28 firmly against the surfaces 37 of the core bar.

Thus, the stacked tooth assemblies 28 are maintained in accurate, preselected, circumferentially spaced relationship by their firm mounting to the core bar 33 of jig 32 so as to define therebetween a corresponding plurality of winding spaces 42. With the stacked assemblies 28 thus secured, the dynamoelectric winding of the stator core may be wound through the slots 42 with the winding being facilitated by the outwardly opening arrangement of the slots at this stage in the manufacturing operation. Such outwardly opening arrangement permits facilitated installation of the insulating means in the bottom of the slots for facilitated construction of the wound tooth core assembly.

Upon completion of the winding operation, the wound tooth core assembly may be fitted to the yoke core 11 by pressing the wound tooth core assembly axially into the yoke core with the head portions 29 of the stacked tooth assemblies being slidably received in the slots 27 of the yoke core. Upon full axial insertion of the wound tooth core assembly into the yoke core, the jig 32 may be removed to complete the assembly of the stator core 10.

As will be obvious to those skilled in the art, any suitable form of lamination interlocking means may be utilized, the configuration of the bosses 16 and 17 illustrated in FIGS. 2-4 being illustrative only.

Further as obvious to those skilled in the art, the specific configuration of the dovetail head portion 29 and base portion 31 of the teeth 19 may be as desired. Thus, more specifically, the configuration of the outer portion 38 of the locking pieces 36 may correspond to any desired configuration of the base portion 31 to effect the desired temporarily locked association of the tooth assemblies 28 to the core bar 33.

Thus, the present invention comprehends an improved stator core assembly 10 which is manufactured by a unique method wherein the stacked tooth core assemblies are temporarily supported by a removable jig to permit facilitated winding of the dynamoelectric winding in the slots between the tooth assemblies and which permits facilitated insulation of the slots. The invention further comprehends the provision of the novel apparatus for effecting the manufacture in the improved manner discussed above.

The foregoing disclosure of specific embodiments is illustrative of the broad inventive concepts comprehended by the invention.

I claim:

1. Apparatus for manufacturing a dynamoelectric machine wound core from a plurality of stacks of teeth having a shank portion and a head portion, and stacked yoke laminations each having an annular array of radially inwardly opening recesses, said stacked teeth being arranged in an annular array to define an annular tooth core arrangement having a plurality of winding slots, said stacked yoke laminations defining an annular yoke core, said apparatus comprising jig means defining a core bar and locking means removably associated with said core bar for temporarily retaining said tooth core assembly on said core bar with said stacked teeth, held accurately in annularly spaced relationship to define therebetween an annular array of winding slots in which a dynamoelectric winding may be wound to define a wound tooth core assembly constructed to be disposed within said yoke core with the head portion of said teeth of the tooth core assembly received in said yoke core recesses to define the dynamoelectric machine core, said jig means further including camming members for urging the stacked teeth radially inwardly into engagement with the core bar to provide the desired accurate annular spaced relationship for receiving said dynamoelectric winding in said tooth core assembly slots.

2. Apparatus for manufacturing a dynamoelectric machine wound core from a plurality of stacks of teeth having a shank portion and a head portion, and stacked yoke laminations each having an annular array of radially inwardly opening recesses, said stacked teeth being arranged in an annular array to define an annular tooth core arrangement having a plurality of winding slots, said stacked yoke laminations defining an annular yoke core, said apparatus comprising jig means defining a core bar and locking means removably associated with said core bar for temporarily retaining said tooth core assembly on said core bar with said stacked teeth held accurately in annularly spaced relationship to define therebetween an annular array of winding slots in which a dynamoelectric winding may be wound to define a wound tooth core assembly constructed to be disposed within said yoke core with the head portion of said teeth of the tooth core assembly received in said yoke core recesses to define the dynamoelectric machine core, said jig means further including camming members and locking pieces urged by said camming members radially inwardly in engagement with said teeth inwardly of said head portion for urging the stacked teeth radially inwardly into engagement with the core bar to provide the desired accurate annular spaced relationship for receiving said dynamoelectric winding in said tooth core assembly slots.

* * * * *